March 8, 1966  R. H. REYNOLDS  3,239,267
TRAILER CONVERTIBLE WIND DIVERTER AWNING
Filed Nov. 18, 1963  2 Sheets-Sheet 1
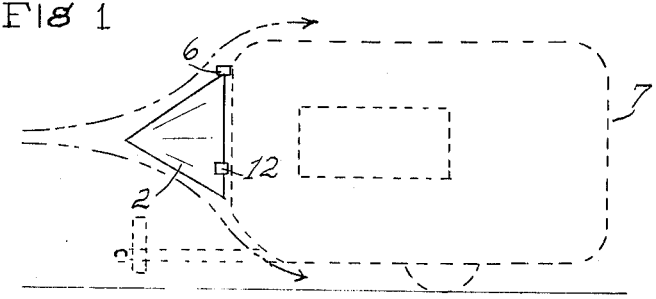
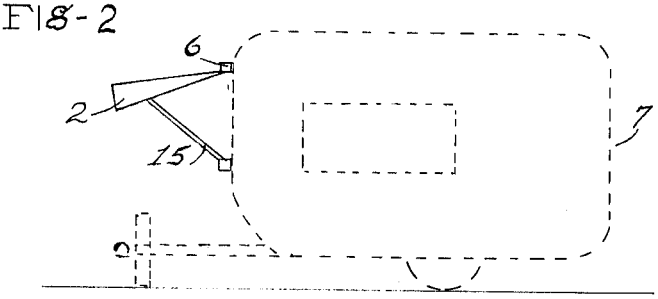
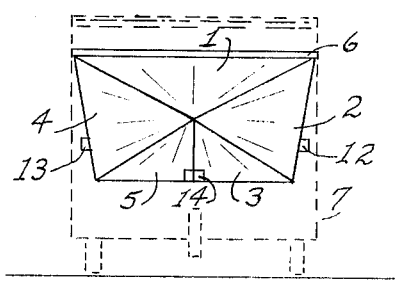
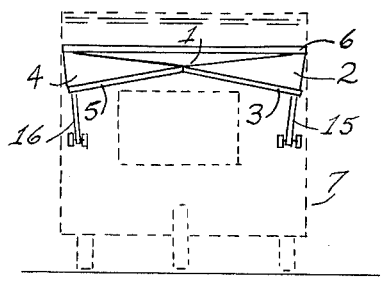
INVENTOR
ROBERT H. REYNOLDS March 8, 1966  R. H. REYNOLDS  3,239,267
TRAILER CONVERTIBLE WIND DIVERTER AWNING
Filed Nov. 18, 1963  2 Sheets-Sheet 2
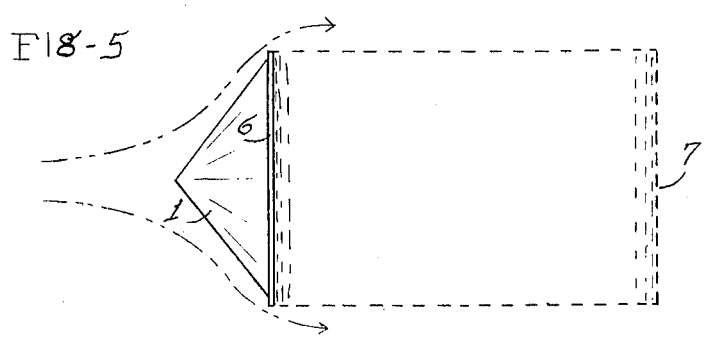
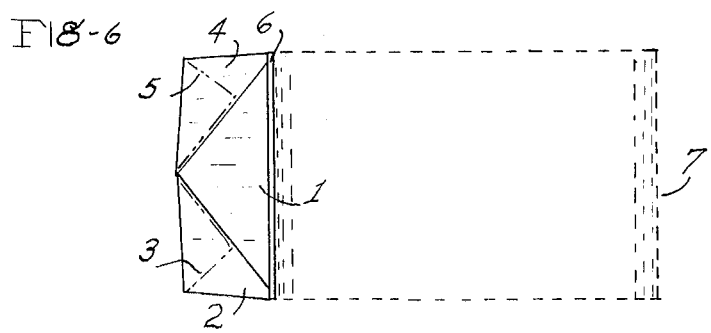
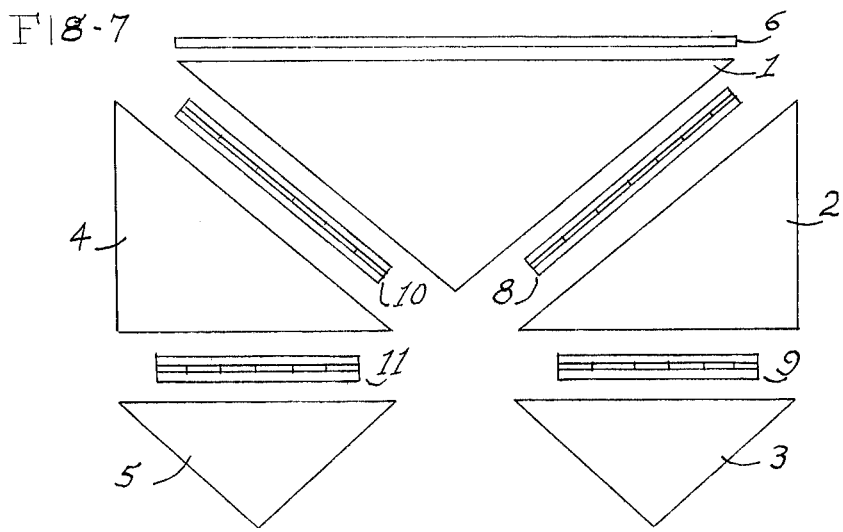
INVENTOR
ROBERT H. REYNOLDS United States Patent Office 3,239,267
Patented Mar. 8, 1966

3,239,267
TRAILER CONVERTIBLE WIND
DIVERTER AWNING
Robert H. Reynolds, Shelby County, Tenn.
(2530 Malone Ave., Memphis 14, Tenn.)
Filed Nov. 18, 1963, Ser. No. 324,543
3 Claims. (Cl. 296—1)

The invention relates to a novel convertible wind diverter awning located on the front exterior end wall of a travel trailer for the purpose of directing the flow of air around the front wall of a trailer thereby reducing the amount of wind resistance which builds up on the wall when traveling and having means of converting into a window awning.

The primary object of the invention is the provision of reducing the wind resistance on a travel trailer when in transit.

Another object of the invention is the provision of a front window protector when a trailer is being towed.

Another further object of the invention is the provision of converting wind diverter into a window awning.

Other important objects and advantageous features of the invention will be apparent from the following descriptions and the accompanying drawings, wherein, for purpose of illustrating only a specific form of the invention is set forth in detail.

In the drawings:

FIGURE 1 is a side elevational view of the convertible wind diverter awning in travel position and is shown on the front of travel trailer. The travel trailer is shown in broken lines.

FIGURE 2 is a side elevational view of the convertible wind diverter awning converted into the form of an awning.

FIGURE 3 is a front end elevational view of the convertible wind diverter awning in travel position and is shown on travel trailer. The travel trailer is shown in broken lines.

FIGURE 4 is a front end elevational view of the convertible wind diverter awning converted into the form of an awning.

FIGURE 5 is a top plan view of the convertible wind diverter awning in travel position and is shown on travel trailer. The travel trailer is shown in broken lines.

FIGURE 6 is a top plan view of the convertible wind diverter awning converted in the form of an awning.

FIGURE 7 is an enlarged top plan view of component triangle panel sections and parts of the convertible wind diverter awning blown apart.

Referring in detail to the drawings, wherein like and related numerals designate like and related parts throughout the several views, and first in FIGURES 1 through 6 the trailer shown therein in broken lines and generally designated 7 is of common design.

In FIGURES 3, 4 and 6 first triangle panel section 1 is hinged to continuous hinge 6 which is of common design. Hinge body connecting rail 6 provides the means of securing first triangle panel section 1 to trailer 7 in a movable upward and downward manner.

As shown in FIGURE 7 piano hinge 8 provides the hinge connecting means of second triangle panel section 2 to first triangle panel section 1. Piano hinge 9 provides the hinge connecting means of the third triangle panel section 3 to second triangle panel section 2. Piano hinge 10 provides the hinge connecting means of the fourth triangle panel section 4 to first triangle panel section 1. Piano hinge 11 provides the hinge connecting means of the fifth triangle panel section 5 to the fourth triangle panel section 4.

In FIGURE 3, latches 12 and 13 can take the form of a barrel door thumb bolt latch, of common design, comprising one male section and one female section. The male sections being secured to body of trailer 7 in respective positions to be received by said female sections secured to second triangle panel section 2 and to fourth triangle panel section 4 respectively. Latches 12 and 13 provide the holding means of the second triangle panel section 2 and of the fourth triangle panel sections 4 to body of trailer 7, respectively, when the convertible wind diverter awning is in down position for travel. Latch 14 can take the form of a barrel door thumb bolt latch, of common design, comprising one male section secured to third triangle panel section 3 and one female section secured to fifth triangle panel section 5. When the convertible wind diverter awning is in down position, latch 14 provides the connecting and holding means of third triangle panel section 3 to fifth triangle panel section 5 by inserting the said male section into the said female section.

In FIGURES 2 and 4, supports 15 and 16 are supporting means for convertible wind diverter awning to trailer 7 when it is raised to form an awning like position in parked status. Said support can take the form of a tube, having its upper end attached in an oscillation like manner to outward side edge on second triangle panel section 2 and another said tube being attached in said identical manner to fourth triangle panel section 4. The lower end of said support tubes having hole adapted to receive aforesaid male section of latch 12 and 13, respectively. When convertible wind diverter awning is prepared for travel position, supports 15 and 16 are disengaged from male section of latches 12 and 13, and then said support tubes are swung to the under side edges of second triangle panel section 2 and fourth triangle panel section 4 respectively, said side edges having adapted means to receive and to hold said tubes in secured like manner, and said means comprising spring like holding clamps.

The triangle panel sections 1, 2, 3, 4 and 5 are preferably of solid construction and the preferred means of connecting one to the other are hinges as shown in FIGURE 7. The said triangle panel sections having triangular sides provide means of all said sections, top, sides and bottoms, to meet in a pointed manner when the convertible wind diverter awning is in travel position and used as a wind diverter. In the latter position a pyramid shape is formed extending forwardly and outwardly from the front end wall of a travel trailer, and in this form affords means of reducing wind resistance on the front end of a travel trailer by diverting the wind around all sides as shown by broken arrow lines in FIGURES 1 and 5.

In FIGURES 4, 6 and 7, the triangle panel sections 3 and 5 are adapted by means of piano hinge 9 and 11 to fold to the under surface area of triangle panel sections 2 and 4, respectively, when convertible wind diverter awning is raised to form an awning like position. The triangle panel sections 3 and 5 are then secured, in the said folded position, to triangle panel sections 2 and 4, respectively, by means of latches. Said latches can take the form of a cabinet door spring latch of common design. Said latch comprising one male section and one female section. Said female section being secured to the under surface area of triangle panel section 2 in position to be received by male section secured to triangle panel section 3 and second said described latch being likewise attached, in said same manner, to triangle panel sections 4 and 5.

In summary, the convertible wind diverter awning serves two principal functions. First, it serves to divert winds around trailer 7 when in travel and in said position hereinafter will be referred to as "down position." Second, it serves to provide the benefits of a window awning on trailer 7 when in parked status and in that said position hereinafter will be referred to as "raised position."

First, the down position of the convertible wind diverter awning will be described. The first triangle panel section 1, having its upper extremity edge attached to continuous hinge 6, is in a lower like inclined plane in relationship to trailer 7 than when normally said section would be in raised position. Triangle panel sections 2 and 4 having means to change their plane like manner relationship with said section 1, said means comprising attachment to said section 1 by piano hinge 8 and 10 respectively, are in vertical like manner in relationship to said section 1 and trailer 7. The said sections 2 and 4 are secured to trailer 7 by latches 12 and 13 respectively. Triangle panel sections 3 and 5 being attached to said sections 2 and 4 respectively, by means of piano hinge 9 and 11 respectively, are secured one to the other by means of latch 14. Said sections 3 and 5 are in a lower like manner in relationship to said sections 2 and 4. This lower like manner position of said sections 3 and 5 fills the aperture between lower edges of triangle panel sections 2 and 4 and trailer 7.

It may be stated at this point in the summary that triangle panel sections 3 and 5 are not absolutely necessary in the performance abilities of the convertible wind diverter awning in diverting winds, thereby reducing wind drag on trailer 7 when in travel, but said sections 3 and 5 may add to the efficiency of the convertible wind diverter awning under some conditions in diverting winds around trailer 7. Further, it may be stated that said sections may be eliminated as means of reducing construction cost.

Next, the raised position and the raising procedure for the convertible wind diverter awning will be described. Third triangle panel section 3 is released from the holding position to fifth triangle panel section 5 by disengaging the male section from the female section of latch 14. Second triangle panel section 2 and fourth triangle panel section 4 are released from trailer 7 by disengaging the male sections from the female sections of latches 12 and 13. Said sections 2 and 4, being adapted by means of hinge 8 and 10 respectively, are lifted upwardly and supports 15 and 16 are released from their respective spring holding clamps. In said position the lower adapted ends of support tubes 15 and 16 are engaged with, the male section of latches 12 and 13 respectively, and in said position the convertible wind diverter awning is secured to trailer 7 in a raised position. In FIGURE 4, triangle panel sections 2 and 4, in raised position, are not in a true horizontal plane like relationship to first triangle panel section 1, nor are said sections 2 and 4 in a true horizontal plane like relationship one to the other but are opposed one to the other. The said inclined plane like relationship of said sections 2 and 4 in this aforesaid secured raised position, are the supporting means of said section 1. The aforesaid action of lifting upwardly said sections 2 and 4 forces said section 1 upwardly correspondingly in inclined plane like relationship to trailer 7.

Although there have been shown and described herein preferred forms of the invention, it is to be understood that the invention is not necessarily confined thereto, and that any changes of components thereof are contemplated as being within the scope of the invention as defined by the claims appended hereto.

What is claimed:

1. A travel trailer wind diverter comprising means of converting to form an awning, said converted awning having side supporting means connected thereto and to said trailer when in raised position, said supporting means adapted to attach to and release from said trailer, said wind diverter having means of latching its vertical sides to said trailer when in down position, said latching means being adapted to release said vertical sides from said trailer, said wind diverter comprising a first triangle panel section having its upper extremity edge hingedly attached to said trailer, a second triangle panel section having one of its side edges hingedly attached to one of the side edges of the said first triangle panel section, a third triangle panel section having one of its side edges hingedly attached to one of the side edges of the second triangle panel section, a fourth triangle panel section having one of its side edges hingedly attached to one of the side edges of the first triangle panel section, a fifth triangle panel section having one of its side edges hingedly attached to one of the side edges of the fourth triangle panel section, and a latch means on the said third and fifth panels adapted for holding said third triangle panel section to said fifth triangle panel section and said latch means adapted to release the two said sections.

2. A travel trailer wind diverter comprising means of converting to form an awning, said converted awning having side supporting means connected thereto and to said trailer when in raised position, said supporting means adapted to attach to and release from said trailer, said wind diverter having means of latching its vertical sides to said trailer when in down position, said latching means being adapted to release said vertical sides from said trailer, said wind diverter comprising a first triangle panel section having its upper extremity edge hingedly attached to said trailer, a second triangle panel section having one of its side edges hingedly attached to one of the side edges of the first triangle panel section, a third triangle panel section having one of its side edges hingedly attached to one of the side edges of the second triangle panel section, a fourth triangle panel section having one of its side edges hingedly attached to one of the side edges of the first triangle panel section, a fifth triangle panel section having one of its side edges hingedly attached to one of the side edges of the fourth triangle panel section, and a latch means on the said third and fifth panels adapted for holding said third triangle panel section to said fifth triangle panel section and said latch means adapted to release the two said sections, said second triangle panel section and said fourth triangle panel section being adapted in hinge like manner to swing upwardly from a vertical like relationship to a horizontal like relative plane relationship to said first triangle panel section.

3. A travel trailer wind diverter comprising means of converting to form an awning, said converted awning having side supporting means connected thereto and to said trailer when in raised position, said supporting means adapted to attach to and release from said trailer, said wind diverter having means of latching its vertical sides to said trailer when in down position, said latching means being adapted to release said vertical sides from said trailer, said wind diverter comprising a first triangle panel section having its upper extremity edge hingedly attached to said trailer, a second triangle panel section having one of its side edges hingedly attached to one of the side edges of the said first triangle panel section, a third triangle panel section having one of its side edges hingedly attached to one of the side edges of the second triangle panel section, a fourth triangle panel section having one of its side edges hingedly attached to one of the side edges of the first triangle panel section, a fifth triangle panel section having one of its side edges hingedly attached to one of the side edges of the fourth triangle panel section, and a latch means on the said third and fifth panels adapted for holding said third triangle panel section to said fifth triangle panel section and said latch means adapted to release the two said sections, said second triangle panel section and said fourth triangle panel section being adapted in hinge like manner to swing upwardly from a vertical like relationship to a horizontal like relative plane relationship to said first triangle panel section, said third triangle panel section adapted in hinge like manner to fold to the under surface area of said second triangle panel section and carrying means of being secured thereto, said means adapted to secure and to release said section, and said fifth triangle panel section adapted in hinge like manner to fold to the under surface area of said fourth triangle panel section and carrying means of being secured thereto, said means adapted to secure and to release said section.

References Cited by the Examiner

UNITED STATES PATENTS

| 609,789 | 8/1898 | Capewell | 296—84 |
| 1,269,447 | 6/1918 | Hover | 296—15 X |
| 1,482,078 | 1/1924 | Hiatt | 296—95 |

BENJAMIN HERSH, *Primary Examiner.*

MILTON BUCHLER, *Examiner.*